Feb. 9, 1926.

A. L. GODWIN ET AL

WIRE GAUGE

Filed March 25, 1924

1,572,353

Paul Anderson,
A. L. Godwin,
Inventors

By Clarence A. O'Brien
Attorney

Patented Feb. 9, 1926.

1,572,353

UNITED STATES PATENT OFFICE.

ALFRED L. GODWIN AND PAUL ANDERSON, OF ELLWOOD CITY, PENNSYLVANIA.

WIRE GAUGE.

Application filed March 25, 1924. Serial No. 701,763.

*To all whom it may concern:*

Be it known that we, ALFRED L. GODWIN and PAUL ANDERSON, citizens of the United States, residing at Ellwood City, in the county of Lawrence and State of Pennsylvania, have invented certain new and useful Improvements in Wire Gauges, of which the following is a specification.

This invention relates to improvements in wire gauges.

An object of the invention is to provide a stationary member, and a movable member provided with cooperating gauging elements adapted to register the gauge of wire, and cooperating jaws, adapted to contact with the wire in the gauging operation.

Another object of the invention resides in providing a stationary member and a movable member slidable in the stationary member, said movable member being provided with scale markings indicative of units of a gauge scale, while the stationary member is provided with a rotatable indicator provided with scale markings forming digits of the units on the movable member, and operable in the movement of the movable member in the stationary member for indicating fractional parts of a gauge unit, registered by the cooperation of the movable members, and the stationary member with said unit gauge marking, when cooperating jaws carried by said member contact with a wire to be gauged.

A further object of the invention resides in providing a wire gauge, wherein a stationary member slidably receives the movable member provided with a rack bar for operating a rotatable gear, which in turn is adapted to rotate a graduated dial, mounted on the stationary member, while the shank of the movable member is provided with unit scale markings of a gauging unit, the scale markings of the dial being portions of the units on the shank of the movable member, said members having cooperating gauging jaws, adapted for contact with the wire to be gauged, so that when the gauging jaws are positioned on opposite sides of a wire to be gauged, the units of the gauge of said wire will be registered on the movable member, by the lower edge of the stationary member, in cooperation therewith, and the digits of the unit will be registered on the dial, for cooperation with the indicating mark on the body of the stationary member.

The invention also includes other objects and improvements in the details of construction, and arrangement of parts, for carrying out the objects, which are more particularly pointed out in the following description and claim, directed to a preferred form of the invention, it being understood, however. that variations may be made in the specific construction and arrangement of these parts, without departing from the scope of the invention as described and claimed.

In the drawing, forming a part of this application:

Figures 1, 2, 3:
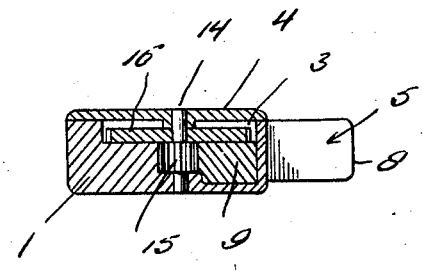
Figure 1, is a side elevation, with parts broken away and the improved wire gauge constructed according to this invention.
Figure 2 is an end elevation thereof.
Figure 3 is a sectional view taken, on the line 3—3 of Figure 1.

1 indicates the stationary member, and 2 the movable member.

The stationary member is recessed as indicated at 3, which recess opens through one side thereof, and which is provided with a cover plate 4, removably secured in any suitable manner to the body of the stationary member. A projection 5, from one side of the lower end of the member forms a handle, by which the same may be held in the operation of the gauge, while the other side of the lower end of the member is provided with a portion fashioned to provide a depending jaw 6, formed on the lower end of the body portion thereof, which is tapered to a substantially narrow gauging face as indicated at 7. The movable member is formed with an eye 8, adapted to provide a handle, so that the wire gauge may be held by means of the eye 8, at the projection 5, during the operation thereof, for gauging wire, while a shank 9 on the movable member slidably extends in one portion of the recess 3 of the stationary member, as clearly shown in Figures 1 and 3, and which is provided with rack teeth 10, along one edge thereof, for a purpose to be presently described. The movable member is provided, at 11, with a removable and adjustable gauging jaw, adapted for cooperation with the jaw 6 of the stationary member engaging wire, which is also formed with a relatively narrow gauging face, formed in a manner similar to the gauging face of the jaw 6. In order to secure the jaw in place, the same is provided with a cylindrical extension 12, recessed axially for a screw 13, which is mounted in the movable member.

A shaft 14 is rotatably mounted in the body of the stationary member, and plate 4, and extends through the recess 3, wherein it mounts for rotating movement a pinion 15, meshing with the rack teeth 10 on the shank 9 of the movable member, and a gear 16 in intermeshed relation with a pinion 17 on the shaft 18, which is also rotatably mounted in the body, and projects through one face thereof for mounting the indicating dial 19. The indicating dial 19 is provided, on the periphery thereof, with a plurality of major scale markings and supplementary scale markings, as indicated at 20, which are adapted to be read in connection with the indicating mark 21, on the body of the stationary member. The shank 9 is provided with a plurality of scale markings indicated at 22, which are measured to indicate unit divisions of a gauge scale, suitable for gauging wire. The scale markings 20 on the dial are properly graduated with respect to the markings 22, and the gearing is of a size, so that the movement of the shank 9 will transmit a rotary movement through the gear 16, to the dial 19, and the intermeshed pinion for rotating the dial 19, one revolution each time the movable member is moved a distance equal to one scale division on the shank relative to the stationary member. The scale 22 on the shank 9 is read in connection with the lower end of the stationary member, indicated at 23, so that the units of a gauge may be read on the shank, and the smaller portions of the units, may be read in connection with the indicator marking 21, and the scale markings on the dial 19, so that wire may be gauged with absolute accuracy.

If, for example, the scale markings 22 indicated tenths, it would be clear that the entire scale, as illustrated in the drawing, would indicate one major unit of a gauging scale, the subdivisions thereof indicating tenths of a unit, and the divisions on the dial 19, indicating one hundredths of the tenths units, and the thousandths of the main unit, so that it will be readily appreciated, that exceedingly fine gauging of wire will result, by the use of a gauge constructed according to the invention as above described. It will also be seen that the gauge may be accurately adjusted in case of wear, through the medium of the adjusting screw 13, for properly adjusting the jaw 11, relative to the jaw 6.

From the above description, it will be apparent that an exceedingly simple and efficient wire gauge has been provided, which is adapted for convenient holding through the medium of the eye 8 and the projection 5, for gauging wire between the jaws 6 and 11.

What is claimed is:

A wire gauge of the class described comprising a relatively stationary casing comprising a body provided in one face with a recess, one end of which opens through the bottom of the body, said bottom embodying a portion which is fashioned to form a stationary jaw, a handle forming extension carried by the lower portion of the body, a removable cover plate for said recess, a relatively movable member comprising a rack bar extending through the opening in the bottom of the body and into the recess, said movable member being provided with a jaw disposed at right angles to said rack bar and arranged opposite and cooperating with the first named jaw and being further provided with a ring like handle opposed to said first named handle, said rack bar being provided with graduations concealed in said casing when the jaws are closed, a graduated dial mounted for rotation upon the exterior of the body, and cooperating gearing arranged in said recess and coacting with said rack bar and dial for moving the dial when the rack bar is operated.

In testimony whereof we affix our signatures.

ALFRED L. GODWIN.
PAUL ANDERSON.